(12) United States Patent
Gage et al.

(10) Patent No.: US 6,999,663 B2
(45) Date of Patent: Feb. 14, 2006

(54) FIBER OPTIC TAP

(75) Inventors: Edward C. Gage, Apple Valley, MN (US); Steven C. Dohmeier, Apple Valley, MN (US); Ronald E. Gerber, Richfield, MN (US); Craig A. Parsons, Victoria, MN (US); Thomas J. Schmitt, Apple Valley, MN (US); Eric K. Lindmark, Shoreview, MN (US); John C. Holman, Coon Rapids, MN (US); Kevin D. Batko, Bloomington, MN (US); Timothy S. Gardner, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 378 days.

(21) Appl. No.: 09/999,533

(22) Filed: Oct. 31, 2001

(65) Prior Publication Data

US 2003/0081901 A1    May 1, 2003

(51) Int. Cl.
*G02B 6/26* (2006.01)
(52) U.S. Cl. .......................... 385/48; 385/39
(58) Field of Classification Search ............ 385/31, 385/33, 34, 36, 37, 39, 48
See application file for complete search history.

(56) References Cited

U.S. PATENT DOCUMENTS

| | | | |
|---|---|---|---|
| 4,213,677 A | 7/1980 | Sugimoto et al. | |
| 4,304,486 A * | 12/1981 | Cormier et al. | 399/55 |
| 4,474,424 A | 10/1984 | Wagner | |
| 4,550,975 A | 11/1985 | Levinson et al. | |
| 5,440,117 A * | 8/1995 | Garrett et al. | 250/225 |
| 5,539,577 A | 7/1996 | Si et al. | |
| 5,612,824 A | 3/1997 | Si et al. | |
| 5,734,762 A | 3/1998 | Ho et al. | |
| 5,781,341 A | 7/1998 | Lee | |
| 5,799,121 A | 8/1998 | Duck et al. | |
| 5,845,023 A | 12/1998 | Lee | |
| 5,889,904 A | 3/1999 | Pan et al. | |
| 5,900,932 A * | 5/1999 | Beretta | 356/328 |
| 5,900,983 A * | 5/1999 | Ford et al. | 359/627 |
| 5,917,626 A | 6/1999 | Lee | |
| 6,002,818 A | 12/1999 | Fatehi et al. | |
| 6,040,944 A | 3/2000 | Pan et al. | |
| 6,055,347 A | 4/2000 | Li et al. | |
| 6,084,994 A | 7/2000 | Li et al. | |
| 6,132,106 A | 10/2000 | Yokoyama | |

(Continued)

FOREIGN PATENT DOCUMENTS

JP        09-304647        11/1997

(Continued)

OTHER PUBLICATIONS

U.S. Appl. No. 10/655,735—"Method for Face-Mounting Optical Components and Devices".

(Continued)

*Primary Examiner*—Juliana Kang
(74) *Attorney, Agent, or Firm*—Carlson, Caspers, Vandenburgh & Lindquist

(57) ABSTRACT

An improved fiber optic tap monitor has characteristics that are flatter over the wavelength range of interest. The polarization dependence of the characteristics of the tap monitor is reduced, and the package for the tap monitor is smaller. The tap monitor reduces the amount of light reflected back to the source. The tap monitor is also assembled in a manner to improve temperature stability, so that its characteristics over a range of temperatures are more nearly constant.

44 Claims, 14 Drawing Sheets

U.S. PATENT DOCUMENTS

| | | | |
|---|---|---|---|
| 6,160,932 | A | 12/2000 | Huang et al. |
| RE37,044 | E | 2/2001 | Wu |
| 6,185,347 | B1 | 2/2001 | Zheng |
| 6,198,858 | B1 | 3/2001 | Pan et al. |
| 6,239,891 | B1 * | 5/2001 | Nakama .................. 385/24 |
| 6,249,626 | B1 * | 6/2001 | Bergmann ................ 385/48 |
| 6,415,067 | B1 | 7/2002 | Copner et al. |
| 6,430,337 | B1 | 8/2002 | Bergmann et al. |
| 6,477,289 | B1 | 11/2002 | Li |
| 6,546,169 | B1 | 4/2003 | Lin et al. |
| 6,766,084 | B1 * | 7/2004 | Campbell ................. 385/47 |
| 2001/0046345 | A1 | 11/2001 | Snyder et al. |
| 2001/0048070 | A1 * | 12/2001 | He et al. ................ 250/225 |
| 2002/0101634 | A1 | 8/2002 | Ye |
| 2002/0106153 | A1 | 8/2002 | Wu et al. |
| 2003/0081908 | A1 | 5/2003 | Gage et al. |
| 2003/0179992 | A1 | 9/2003 | Robilliard |

FOREIGN PATENT DOCUMENTS

| | | |
|---|---|---|
| JP | 09304647 A | 11/1997 |
| JP | 2001147341 A | 5/2001 |

OTHER PUBLICATIONS

U.S. Appl. No. 10/656,920—Fiber Optic Tap With compensated Spectral Filter.

* cited by examiner

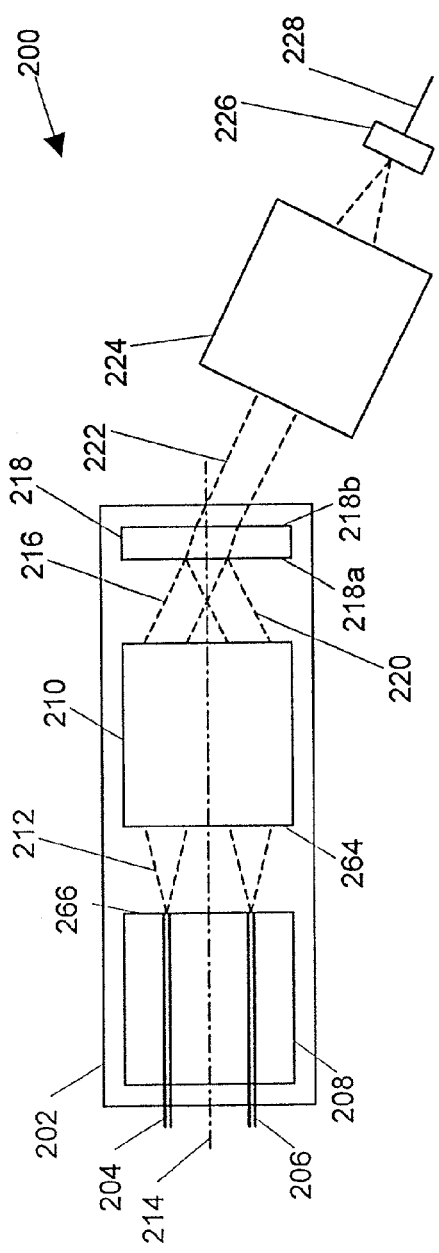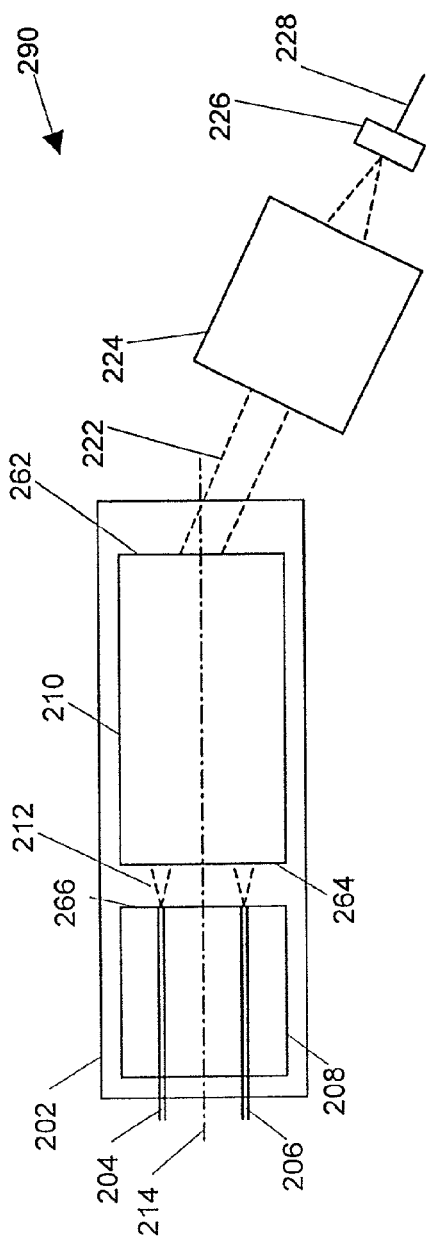

FIBER OPTIC TAP

FIELD OF THE INVENTION

The present invention is directed generally to fiber optical components, and more particularly to a fiber optic tap for tapping a fraction of light from an optical signal propagating in an optical fiber.

BACKGROUND

Optical fibers find many uses for directing beams of light between two points. Optical fibers have been developed to have low loss, low dispersion, polarization maintaining properties and can be incorporated into several different types of devices, such as amplifiers, filters, lasers and interferometers. As a result, optical fiber systems find widespread use, for example in optical communications.

However, one of the important advantages of fiber optic beam transport, that of enclosing the optical beam to guide it between terminal points, is also a limitation. There are several optical components, important for use in fiber systems or in fiber system development, that are not implemented in a fiber—based form where the optical beam is guided in a waveguide. Instead, these optical components are implemented in a bulk form, and through which the light propagates freely. Examples of such components include, but are not limited to, filters, isolators, circulators, polarizers, switches and shutters. Consequently, the inclusion of a bulk component in an optical fiber system necessitates that the optical fiber system have a section where the beam path propagates freely in space, rather than being guided within a fiber.

Free space propagation typically requires use of collimation units at the ends of the fibers to produce and receive collimated beams. In some units, the same focusing element is used to collimate the beams from two different fibers placed at different positions relative to the axis of the focusing optic. This produces collimated beams that propagate in non-parallel directions. The non-parallel propagation of the collimated beams introduces extra issues for aligning the components of the device, and may place some limits on making the device smaller in size.

A fiber optic tap is a device that splits off a fraction of the light propagating in the optical fiber, typically for monitoring the power in the optical signal. In conventional approaches, the light is split from a first fiber to a second fiber spliced together with the first fiber, for example a fused biconic taper. The split ratio may be tailored so that a prescribed fraction of the incident signal is directed along the second fiber, with the remaining majority of the signal passing along the first fiber. The second fiber is typically directed to a photodetector. One problem with this approach is that the fraction of the light coupled into the second fiber may not be constant over all wavelengths of interest, and may suffer from undesirable polarization dependent effects. Another problem with this approach is that the fiber-based device requires a certain minimum fiber bend radius, which places constraints on the minimum size of the package.

SUMMARY OF THE INVENTION

Accordingly, there is a need for an improved approach to producing fiber optic taps whose characteristics are flatter over the wavelength range of interest, where the polarization dependent characteristics are reduced, and where the package is smaller. Furthermore, there is a need for a fiber optic tap that reduces the amount of light reflected back to the source. There is also a need for improved temperature stability in the fiber optic tap, so that its characteristics over a range of temperatures are more nearly constant.

One embodiment of the invention is directed to a tap monitor unit that has a focusing unit having an optical axis, an input port and a filter unit on the optical axis. A first optical path is defined from the first port through the first focusing unit to the filter unit. The first path is incident on a first side of the filter unit in a direction non-parallel with the optical axis. A photodetector is disposed on a second side of the filter unit. A second optical path between the filter unit and the photodetector is substantially parallel to the first optical axis. Light propagating on the first optical path is transmitted through the filter unit along the second optical path to the photodetector.

Another embodiment of the invention is directed to an optical system that has an optical transmitter producing output light, an optical receiver receiving at least a portion of the output light, and an optical fiber link coupling between the optical transmitter and the optical receiver. The optical fiber link includes a tap monitor having a focusing unit having an optical axis, and an input port coupled to receive light from the optical fiber link and a filter unit on the optical axis. A first optical path is defined from the first port through the first focusing unit to the filter unit. The first optical path is incident on a first side of the filter unit in a direction non-parallel with the optical axis. A photodetector is disposed on a second side of the filter unit. A second optical path between the filter unit and the photodetector is substantially parallel to the first optical axis. Light propagating on the first optical path is transmitted through the filter unit along the second optical path to the photodetector.

Another embodiment of the invention is directed to a method of monitoring light propagating along an optical fiber. The method includes transmitting the light from the fiber through a focusing unit to form a substantially collimated beam that propagates in a direction non-parallel with an optical axis of the focusing unit, and transmitting a portion of the substantially collimated beam through a filter unit. The transmitted portion of the substantially collimated beam is diverted into a direction substantially parallel to the optical axis using the filter unit, and is detected.

Another embodiment of the invention is directed to a device for monitoring light propagating along an optical fiber. The device includes means for transmitting the light from the fiber through a means for focusing to form a substantially collimated beam that propagates in a direction non-parallel with an optical axis of the means for focusing, and means for transmitting a portion of the substantially collimated beam through a means for filtering. The device also includes means for diverting the transmitted portion of the substantially collimated beam into a direction substantially parallel to the optical axis, and means for detecting the transmitted portion of the substantially collimated beam.

Another embodiment of the invention is directed to a monitor unit for monitoring light within a wavelength range and propagating within an optical fiber. The unit includes an input port, a focusing unit and a filter unit. The input port and focusing unit are disposed on a first side of the filter unit. Light from the input port passes through the focusing unit to the filter unit. A photodetector unit disposed on a second side of the filter unit receives light transmitted through the filter unit. The photodetector unit has at least one photodetector element having a detector spectral response over the wavelength range. The filter unit has a spectral transmission characteristic selected to at least partially compensate for non-uniformity in the detector spectral response so that a monitor spectral response is more uniform than the detector spectral response.

Another embodiment of the invention is directed to an optical system that includes an optical transmitter producing output light, an optical receiver receiving at least a portion of the output light, and an optical fiber link coupling between the optical transmitter and the optical receiver. The optical fiber link has a monitor unit that includes an input port coupled to receive light from the optical fiber link, a focusing unit, and a filter unit. The input port and focusing unit are disposed on a first side of the filter unit. Light from the input port passes through the focusing unit to the filter unit. A photodetector unit disposed on a second side of the filter unit receives light transmitted through the filter unit. The photodetector unit has at least one photodetector element having a detector spectral response over the wavelength range. The filter unit has a spectral transmission characteristic selected to at least partially compensate for non-uniformity in the detector spectral response so that a monitor spectral response is more uniform than the detector spectral response.

Another embodiment of the invention is directed to a method of monitoring light within a wavelength range propagating along an optical fiber. The method includes transmitting the light from the fiber through a focusing unit to form a substantially collimated beam propagating towards a filter unit having a filter spectral transmission characteristic, and transmitting a portion of the substantially collimated beam through the filter unit. The transmitted portion of the substantially collimated beam is detected with a photodetector having a detector spectral response. The filter spectral transmission characteristic is selected to reduce non-uniformities in the detector spectral response over the wavelength range.

Another embodiment of the invention is directed to a device for monitoring light within a wavelength range propagating along an optical fiber. The device includes means for transmitting the light from the fiber through a means for focusing to form a substantially collimated beam propagating towards a means for filtering having a filter spectral transmission characteristic and means for transmitting a portion of the substantially collimated beam through the means for filtering. The device also includes means for detecting the transmitted portion of the substantially collimated beam having a detector spectral response. The filter spectral transmission characteristic is selected to reduce non-uniformities in the detector spectral response over the wavelength range.

Another embodiment of the invention is directed to a monitor unit for monitoring light propagating within an optical fiber. The unit includes an input port and a filter unit. The input port is disposed on a first side of the filter unit. A photodetector unit, having a detector element, is disposed on a second side of the filter unit. One or more elements along a light path from the input port to the detector element have a polarization dependent loss selected so as to at least partially compensate for polarization dependent loss of the filter unit, so as to reduce polarization dependent responsivity of the monitor unit.

Another embodiment of the invention is directed to an optical system that includes an optical transmitter producing output light, an optical receiver receiving at least a portion of the output light, and an optical fiber link coupling between the optical transmitter and the optical receiver. The optical fiber link includes a monitor unit having an input port coupled to receive light from the optical fiber link and a filter unit. The input port is disposed on a first side of the filter unit. A photodetector unit, having a detector element, is disposed on a second side of the filter unit. One or more optical elements along a light path from the input port to the detector element have a polarization dependent loss selected so as to at least partially compensate for polarization dependent loss of the filter unit, so as to reduce polarization dependent responsivity of the monitor.

Another embodiment of the invention is directed to a method of monitoring light with low polarization dependence, the light propagating along an optical fiber. The method includes transmitting the light from the fiber through a focusing unit to form a substantially collimated beam propagating towards a filter unit, and transmitting a portion of the substantially collimated beam through the filter unit in a direction non-normal to an optical surface of the filter unit. The transmitted portion of the substantially collimated beam is detected with a photodetector unit to generate a detection signal. A polarization dependent loss (PDL) incurred by non-normal incidence on the optical surface of the filter unit is compensated so as to reduce polarization dependent responsivity (PDR) of the detection signal.

Another embodiment of the invention is directed to a device for monitoring light with low polarization dependence, the light propagating along an optical fiber. The device includes means for transmitting the light from the fiber through a focusing unit to form a substantially collimated beam propagating towards a filter unit, and means for transmitting a portion of the substantially collimated beam through the filter unit in a direction non-normal to an optical surface of the filter unit. The device also includes means for detecting the transmitted portion of the substantially collimated beam with a photodetector unit to generate a detection signal and means for compensating a polarization dependent loss (PDL) incurred by non-normal incidence on the optical surface of the filter unit so as to reduce polarization dependent responsivity (PDR) of the detection signal.

Another embodiment of the invention is directed to a method of mounting an optical element to a mount for use in a predetermined temperature range, the mount having a protruding tip contact region on a mounting surface. The method includes providing adhesive between the optical element and the mounting surface and pressing the optical element into contact with the protruding contact tip region thereby substantially expelling the adhesive from between the optical element and the protruding contact tip region. The adhesive is then cured at a temperature exceeding the predetermined temperature range.

Another embodiment of the invention is directed to an optical device for use in a predetermined temperature range. The device includes a mount having a first mounting surface provided with a protruding tip contact region. The protruding tip contact region defines a mounting plane. An element to be mounted has a second mounting surface contacting the protruding tip contact region. An adhesive is attachingly disposed between portions of the first and second mounting surfaces that are not in mutual contact.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 2A and 2B schematically illustrate embodiments of a fiber optic tap monitor;

Figure 1:
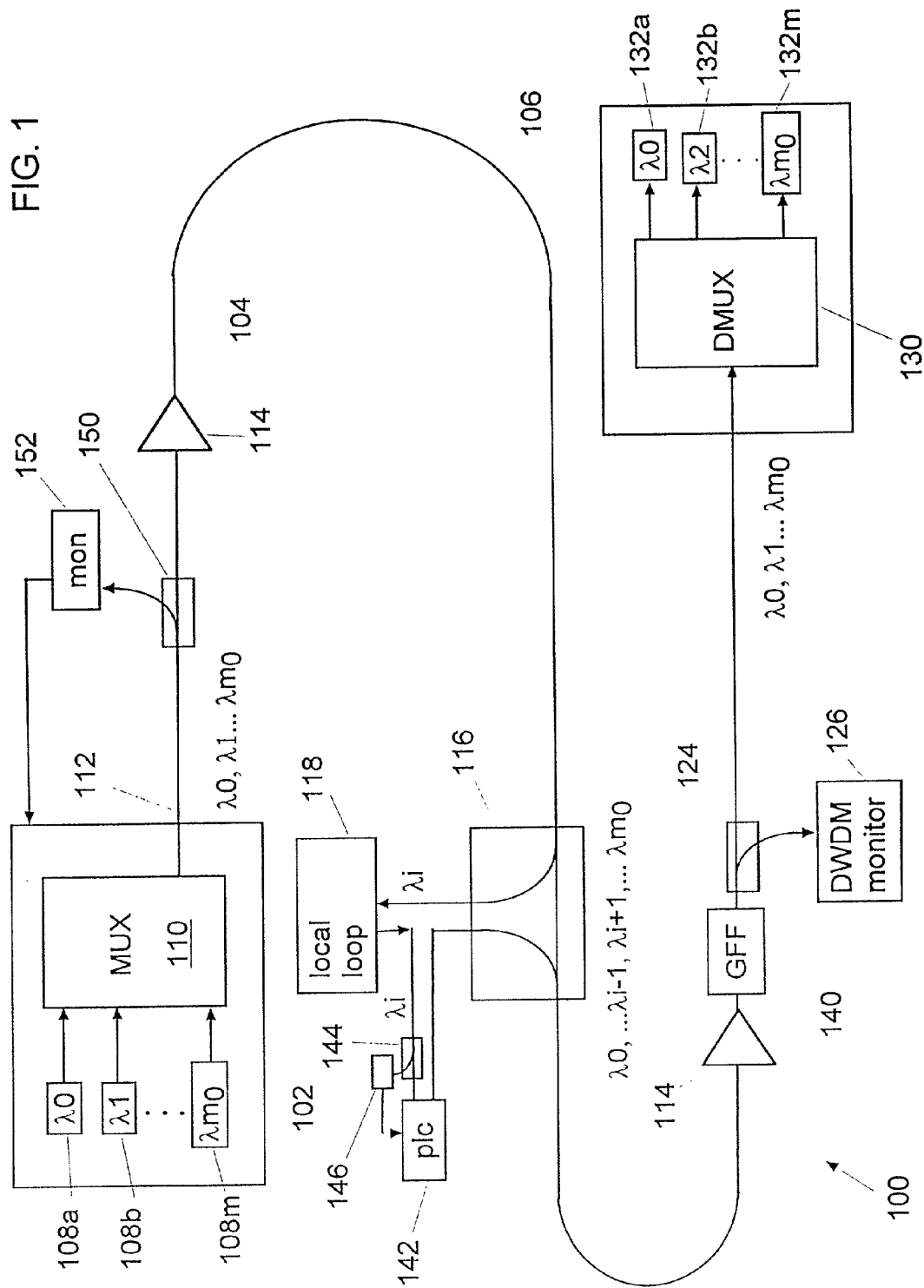
FIG. 1 schematically illustrates a fiber optic communications system in which a tap is used to split off light for monitoring the optical signal on an optical fiber, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to fiber optic devices, and is believed to be particularly useful with fiber optic taps for producing a monitor signal. The present invention is also believed to be useful in reducing the sensitivity of operating characteristics of a fiber optic device to fluctuations in temperature.

A fiber optic tap is important for extracting a fraction of the light propagating along a fiber so as to permit the optical signal to be monitored. Different types of monitors may be used, including a tap monitor and a channel monitor. In the tap monitor, the tapped fraction of the light is directed to a photodetector to measure the total power in the optical signal. A channel monitor is typically used in multiple channel communications systems, for example, dense wavelength division multiplexed (DWDM) systems. The channel monitor splits the tapped fraction of light into its separate channels and measures the amount of light in each channel individually. This permits the operator to determine whether the power in the multiple channel optical signal is evenly distributed among all optical channels.

A schematic of an embodiment of an optical communications system 100 is presented in FIG. 1, showing how taps are employed to produce monitor signals. A DWDM transmitter 102 directs a DWDM signal having $m_0$ channels through a fiber communications link 104 to a DWDM receiver 106.

In this particular embodiment of DWDM transmitter 102, a number of light sources 108a–108m generate light at different wavelengths, $\lambda 0, \lambda 1 \ldots \lambda m_0$, corresponding to the different optical channels. The light output from the light sources 108a–108m is combined in a DWDM combiner unit 110, or multiplexer (MUX) unit to produce a DWDM output 112 propagating along the fiber link 104.

Light sources 108a–108m may be modulated laser sources, or laser sources whose output is externally modulated, or the like. It will be appreciated that the DWDM transmitter 102 may be configured in many different ways to produce the DWDM output 112. For example, the MUX unit 110 may include an interleaver to interleave the outputs from different multiplexers. Furthermore, the DWDM transmitter 102 may be equipped with any suitable number of light sources for generating the required number of optical channels. For example, there may be twenty, forty or eighty optical channels, or more. The DWDM transmitter 102 may also be redundantly equipped with additional light sources to replace failed light sources.

Upon reaching the DWDM receiver 106, the DWDM signal is passed through a demultiplexer unit (DMUX) 130, which separates the multiplexed signal into individual channels that are directed to respective detectors 132a–132m.

The fiber link 104 may include one or more fiber amplifier units 114, for example rare earth-doped fiber amplifiers, Raman fiber amplifiers or a combination of rare earth-doped and Raman fiber amplifiers. The fiber link 104 may include one or more DWDM channel monitors 126 for monitoring the power in each of the channels propagating along the link 104. Typically, a fraction of the light propagating along the fiber link 104 is coupled out by a tap coupler 124 and directed to the DWDM channel monitor 126. The fiber link 104 may also include one or more gain flattening filters 140, typically positioned after an amplifier unit 114, to make the power spectrum of different channels flat. The channel monitor 126 may optionally direct channel power profile information to the gain flattening filter 140. The gain flattening filter 140 may, in response to the information received from the channel monitor 126, alter the amount of attenuation of different channels in order to maintain a flat channel power profile, or a channel power profile having a desired profile.

The fiber link 104 may include one or more optical add/drop multiplexers (OADM) 116 for directing one or more channels to a local loop. In the particular embodiment illustrated, the OADM 116 drops the ith channel, operating at wavelength $\lambda i$, and directs it to the local loop 118. The local loop 118 also directs information back to the OADM 116 for propagating along the fiber link 104 to the DWDM receiver 106. In the illustrated embodiment, the information added at the OADM 116 from the local loop 118 is contained in the ith channel at $\lambda i$. It will be appreciated that the information directed from the local loop 118 to the OADM 116 need not be at the same wavelength as the information directed to the local loop 118 from the OADM 116. Furthermore, it will be appreciated that the OADM 116 may direct more than one channel to, and may receive more than one channel from, the local loop 118.

The amount of light being added to the fiber link 104 from the local loop 118 may be monitored and controlled so that the optical power added in the channel at $\lambda i$ is at approximately the same level as the power in the other channels $\lambda 0$ to $\lambda i-1$, and $\lambda i+1$ to $\lambda m_0$. The light from the local loop 118 may be passed through a power level controller 142 (plc) that controls the level of power in the channels being added in the OADM 116. The power level controller 142 may include a variable attenuator to reduce power and/or an amplifier to increase power. A tap 144 extracts a fraction of the light and passes the extracted light to the monitor 146 that detects the power of the light being added in the OADM 116. The monitor 146 directs a signal to the power level controller 142 which adjusts the power of the light upwards or downwards, depending on the signal received from the monitor 146, so as to set the power of the light being added at the OADM 116 to be approximately the same as that of the other channels.

A tap 150 and monitor 152 may also be positioned to monitor the DWDM signal 112 emitted by the transmitter 102. The monitor 152 may feed back a control signal to the transmitter 102 to control the level of the DWDM signal 112, based upon the power level detected by the monitor 152.

One type of tap monitor 200, that combines the functions of tapping off a fraction of the light and monitoring the power level in the tapped fraction, is schematically illustrated in FIG. 2A. The tap monitor 200 includes a dual fiber collimator 202 having first and second fibers 204 and 206 mounted in a dual fiber ferrule 208. A GRIN lens 210 collimates light 212 from the first fiber 204. Since the first fiber 204 is not on the axis 214 of the GRIN lens 210, the collimated light 216 propagates at an angle with respect to the axis 214. The collimated light 216 reflects off a filter 218 that has a mostly reflective coating on its first surface 218a. The light 220 reflected from the filter 218 is focused through the GRIN lens 210 to the second fiber 206. The light 222 transmitted through the filter 218 at an angle to the axis 214 is focused using a second GRIN lens 224 on to a photodiode 226. The photodiode 226 generates an electrical output signal 228 that is dependent on the power of the light incident on the photodiode's active surface.

One reason for using the second GRIN lens 224 is that the position of the transmitted beam 222 is not well known during fabrication, and it may be easier to align the transmitted beam 222 to the photodiode 226 using the second GRIN lens 224 than to accurately align all the other optical elements in the tap monitor 200.

Another embodiment of a tap monitor device 290 is schematically illustrated in FIG. 2B. The device 290 is similar to the device 200 illustrated in FIG. 2A, except that the output face 262 of the first GRIN lens 210 is coated with the thin film filter. In both devices 200 and 290, the ferrule end 266 and the first surface 264 of the GRIN lens 210 may be angled to reduce the effects of surface reflections.

An embodiment of a tap monitor 300 according to the present invention is presented in schematic form in FIG. 3. In this tap monitor 300, the position and direction of the beam transmitted through the filter are known. Therefore, alignment of the transmitted beam to the detector is straightforward, and does not require a second lens.

The tap monitor 300 includes a dual fiber collimator 301 having a first lens 302 and dual-fiber ferrule 304. Two fibers 306 and 308 are held in the ferrule 304, with their ends 306a and 308a positioned at a distance from the lens 302 equal to about the focal length of the lens 302. The ferrule end 304a, and the fiber ends 306a and 308a may be polished at a small angle, approximately 1°–8° or so, to prevent reflections feeding to other elements.

The lens 302 may be a GRIN lens or may be a lens having a curved refracting surface. For example, the lens 302 may be an aspheric lens. The lens 302 may be formed from glass, an optically transmitting polymer, or other suitable transmitting material. The focal length of the lens 302 may be in the range 1 mm–5 mm.

In the illustrated embodiment, a first light beam 310, from the first fiber 306, passes through the lens 302 and is collimated. However, since the beam 310 is not positioned on the lens axis 312, the collimated beam 314 propagates at an angle, $\theta 1$, to the axis 312. The value of $\theta 1$ is typically in the range 1.5°–2.50°. The collimated beam 314 is incident on the filter 316, which has a reflective coating on its front surface 316a. The reflectivity of the reflective coating is typically high, and may be in the range 90%–99.9%, so that only a small fraction (0.1%–10%) of the power in the beam 314 is transmitted through the filter 316. The light 318 reflected by filter 316 is directed to the first lens 302 which focuses the beam 320 to the second fiber 308. The filter 316 may also transmit a portion of a particular wavelength band or an individual optical channel, to permit monitoring of that wavelength band or individual channel.

The light 322 transmitted through the filter 316 passes to a photodetector unit 324, which detects the power of the transmitted beam 322. The photodetector unit 324 may be a photodiode, or other type of light detecting device. Where the photodetector unit 324 is based on a semiconductor material, the band gap of the semiconductor is advantageously arranged to be less than the energy of the photons being detected. For example, the light entering the tap monitor 300 may be an optical communications signal having a wavelength in the range 1300–1650 nm. Accordingly, the photodetector unit 324 may be based on a semiconducting material that absorbs light in this wavelength range, for example indium gallium arsenide, germanium and the like.

The filter 316 is wedged at an angle, for example around 5°, so that refraction of the transmitted beam 322 by the filter 316 directs the beam 322 along a direction parallel to the optical axis 312 of the first lens 302, towards the photodetector 324. The DFC 301 is aligned within a housing 330, with its axis 312 substantially parallel to the axis of the housing 330. Therefore, the transmitted beam 322 propagates largely parallel to the housing. The use of a wedged element to produce a light beam propagating parallel to the axis from a dual fiber collimator is discussed further in U.S. patent application Ser. No. 09/999,891, and incorporated herein by reference. Typically, the first surface 316a of the filter has the reflective coating while the second surface 316b has an antireflection coating.

The photodetector unit 324 is attached to the housing 330 so that the detector chip 332 is tilted away from the beam 322, for example by at least 1.5°, and preferably 2°. The photodetector unit 324 may also include a window 334 in front of the chip 332 that is also tilted away from the beam 322. This tilt reduces the likelihood of reflections from the detector chip 332, or the window 334 if present, from propagating backwards towards the first fiber 306. Thus, the return loss, which determines the amount of light propagating back along the first fiber 306, may be very large, for example in the range 50 dB–65 dB. Accordingly, the amount of light propagating back to the first fiber 306 is low. This is a significantly higher return loss than is found in many commercially available devices, typically about 45 dB.

Figure 3A:
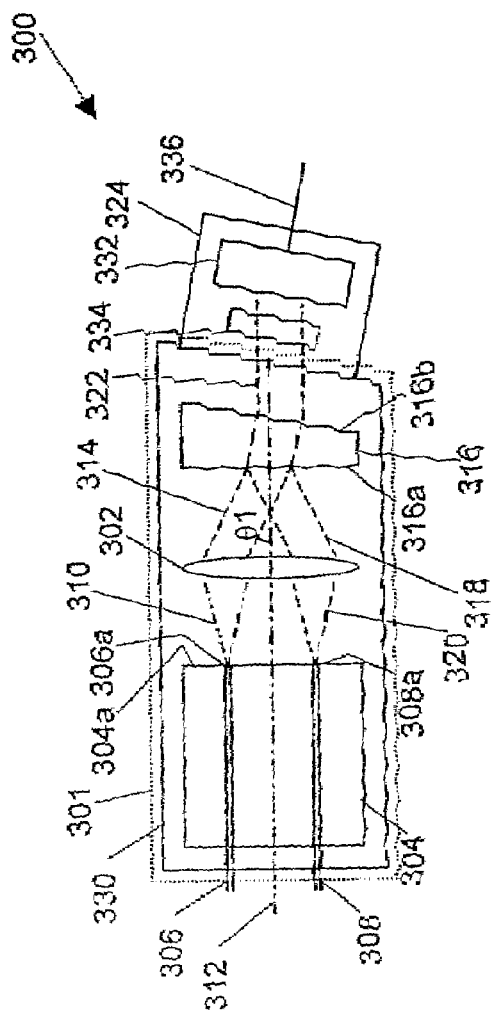
FIGS. 3A and 3B schematically illustrate embodiments of a fiber optic tap monitor according to the present invention.

The arrangement illustrated in FIG. 3A simplifies the assembly process. Specifically, the parallel transmitted beam 322 permits a narrower acquisition range for further alignments. Another advantage is that the parallel output beam enables use of autocollimation methods during construction of the dual-fiber collimator. This also allows for a narrower acquisition range for further alignments. Furthermore, the device may be less susceptible to thermal effects caused, for example, by thermal expansion of components in a radial direction.

In an example of a device as illustrated in FIG. 3A, the fibers 306 and 308 have a diameter of around 125 μm and are set in the dual-fiber ferrule 304 at a center-to-center spacing of 125 μm. The lens 302 is aspherical, having a focal length in the range 1.5–2.5 mm, and so θ1 has a value of approximately 1.5°–2.5°. The filter 316 may be based on a substrate formed of glass, such as BK7 or B270 glass, and have a wedge angle of around 4.8°. It is to be understood that the values for the various components provided in this paragraph are provided for illustrative purposes only, and are not intended to limit the invention in any way. For example, the wedge angle of the filter 316 depends on the angle of incidence on the filter face 316a and the refractive index of the filter glass substrate, and may range from 2°–5° or more.

The tap monitor 300 may manifest a lower insertion loss than in a fused biconical taper tap monitor. The insertion loss is the loss along the reflected light path from the first fiber 306 to the second fiber 308. The insertion loss of the tap monitor 300 is lower because a fused biconical taper tap monitor is subject to mode field dependent losses, including wavelength and polarization dependent losses.

Furthermore, the polarization dependent losses (PDL) are lower in the tap monitor of the present invention than in a spliced tap monitor assembly. The PDL is the variation in the insertion loss as the incident polarization is varied. Very low PDL values, for example in the range 0.001 dB–0.05 dB may be obtained at the small angles of incidence on the filter described here (1.5°–2.5°). These values of PDL are smaller than those typically obtained from a fused biconic taper splitter (0.1 dB–0.2 dB).

The tap monitor 300 also has a lower polarization dependent responsivity (PDR). PDR is the variation in detector response as the incident polarization is varied. The PDR of a monitor is determined by the PDL of the light beam that is directed to the photodetector. One contribution to the light beam's PDL is the polarization dependence of the filter transmission. In general, this is significantly greater in magnitude than the PDL of the light reflected back to the first fiber 306 because the ratio of the transmitted to reflected PDLs is approximately the inverse of the ratio of the power in the reflected and transmitted beams 318 and 322. A typical ratio of the reflected power to the transmitted power for the tap monitor 300 is 95:5, thus making the PDL of the transmitted beam 322 around 18 times larger than that for the reflected beam 318. For this embodiment of tap monitor 300, the PDL for the portion 322 of the incident beam that is directed onto the photodetector unit 324 is calculated to be 0.024 dB when using a lens for which the angle of incidence of the beam on the filter 316 is 2.4°.

A second contribution to the device's PDR is the polarization dependence of the transmitted beam 322 as it traverses the window 334 of the photodetector unit 324. An important advantage of the tap monitor 300 is that these contributions to the PDR may be offset from one another and thus produce a very small, or even zero, total PDR for the device. This is due to the vector addition of the PDL and the fact that the plane of incidence of the light 322 on the detector chip 332 and the window 334 may be arbitrarily adjusted relative to the plane of incidence of the light 314 on the filter 316.

In the above example, the beam 322 transmitted through the filter 316 towards the photodetector unit 324 had a PDL of 0.024 dB. This translates to a PDR value for the electrical signal generated by the photodetector unit 324 of about the same magnitude, which may be undesirably high. The PDL contribution from the window 334 may be used to offset this value of PDL to zero by rotating the window 334 so that the plane of incidence of the beam 322 on the window 334 is perpendicular to the plane of incidence of the beam 314 on the filter 316. Where the window 334 is made from uncoated BK7 glass, the two contributions to the total PDL, namely the contributions from the filter 316 and the window 334, sum to zero for a 10° angle of incidence upon the window 334.

Figure 3B:
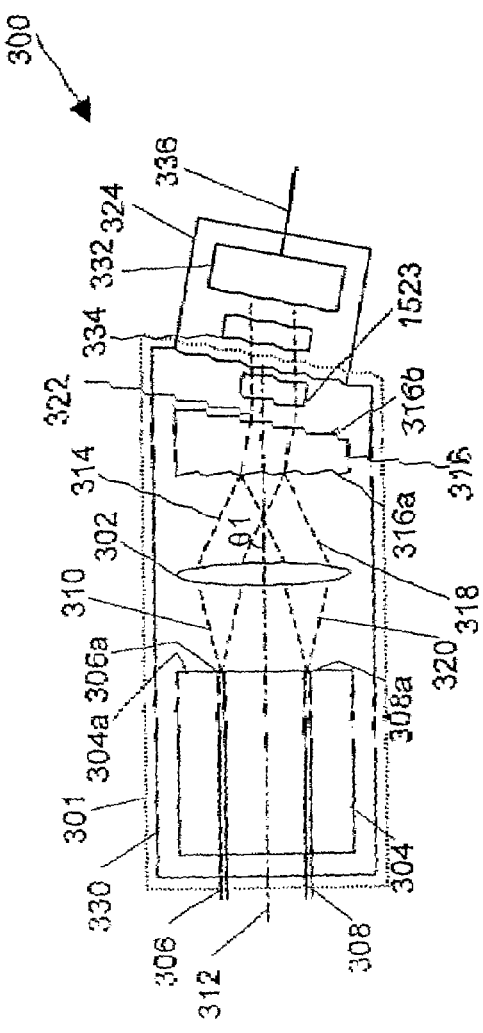

A third contribution to the PDL is generated when the beam 322 reflects from detector chip 332. This reflection may also be used to produce the desired low total value of PDL. In general, the contributions to the total PDL of the beam 322, and thus the PDR of the signal from the photodetector unit 324, may be tuned by controlling the angle of incidence of the beam 322 or 314 upon the optical surfaces it traverses, the composition of those surfaces, and/or by the presence of thin-film coatings on the surfaces. Another optical element 1523, for example an optical blank, may be inserted at an angle to the beam 322, as illustrated in FIG. 3B, so as permit tuning of the total PDR of the photodetector unit's output signal, and may also permit tuning the PDR to zero. The PDR tuning element 1523 may also be positioned between the first fiber 306 and the filter 316. The properties of the coatings on the window 334 and/or the detector chip 332 may additionally be adjusted to obtain the desired small PDR.

The tap monitor 300 is significantly more compact than a spliced-fiber type of tap monitor, since the tap monitor does not require a splice protector and because there is no fiber loop having a minimum allowable bend radius. Furthermore, the tap monitor 300 has advantages over the assembly illustrated in FIGS. 2A and 2B. The alignment is simpler, since the direction of the transmitted beam 322 is known and there is only one lens. The return loss is lower and, since there is only one lens, the package may be made more compact.

Figure 4:
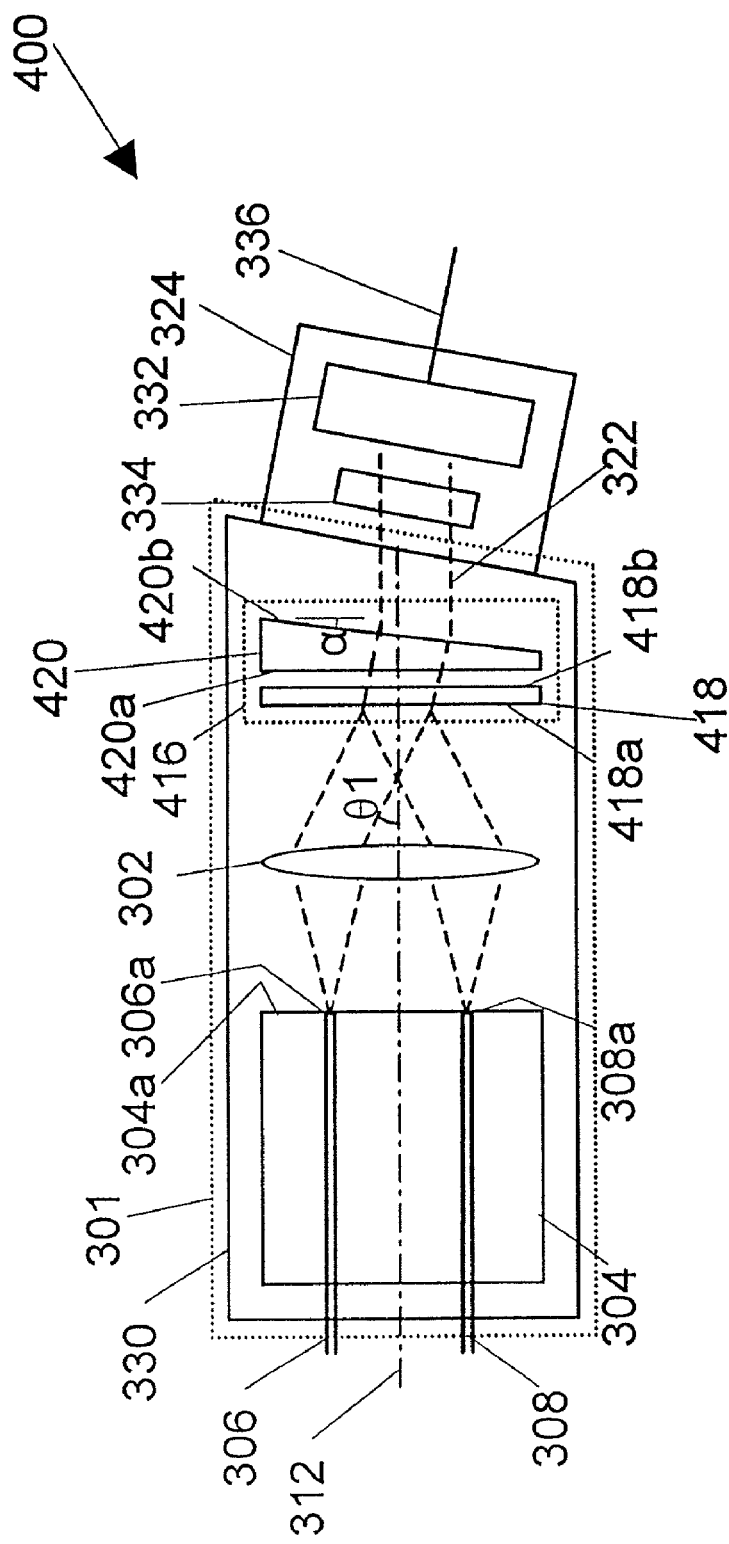
FIG. 4 schematically illustrates another embodiment of a fiber optic tap monitor according to the present invention.

Another embodiment of a tap monitor 400 is schematically illustrated in FIG. 4. Several elements of this tap monitor are similar to those identified in the tap monitor 300 discussed above, and are identified with similar element numbers. In this embodiment, however, the filter unit 416 includes two elements, a filter element 418 and a deviating element 420. The filter element 418 has surfaces 418a and 418b that are either parallel to each other, or are within about 1° or less of being parallel.

The deviating element 420 has surfaces 420a and 420b that define a wedge angle, α, that is significantly greater than the angle between the surfaces 418a and 418b of the filter element. The beam 322 is refracted primarily by the deviating element 420 so as to propagate in a direction substantially parallel to the optical axis 312.

An important feature of monitoring tapped light from a fiber link is that the monitoring process should be largely independent of the wavelength of the light being monitored. For example, if a signal propagates along the fiber link at one wavelength, and then the wavelength changes to another value, the monitor process ideally sees no difference in the power of the monitored signal if the power in the fiber link is held constant.

Figure 5:
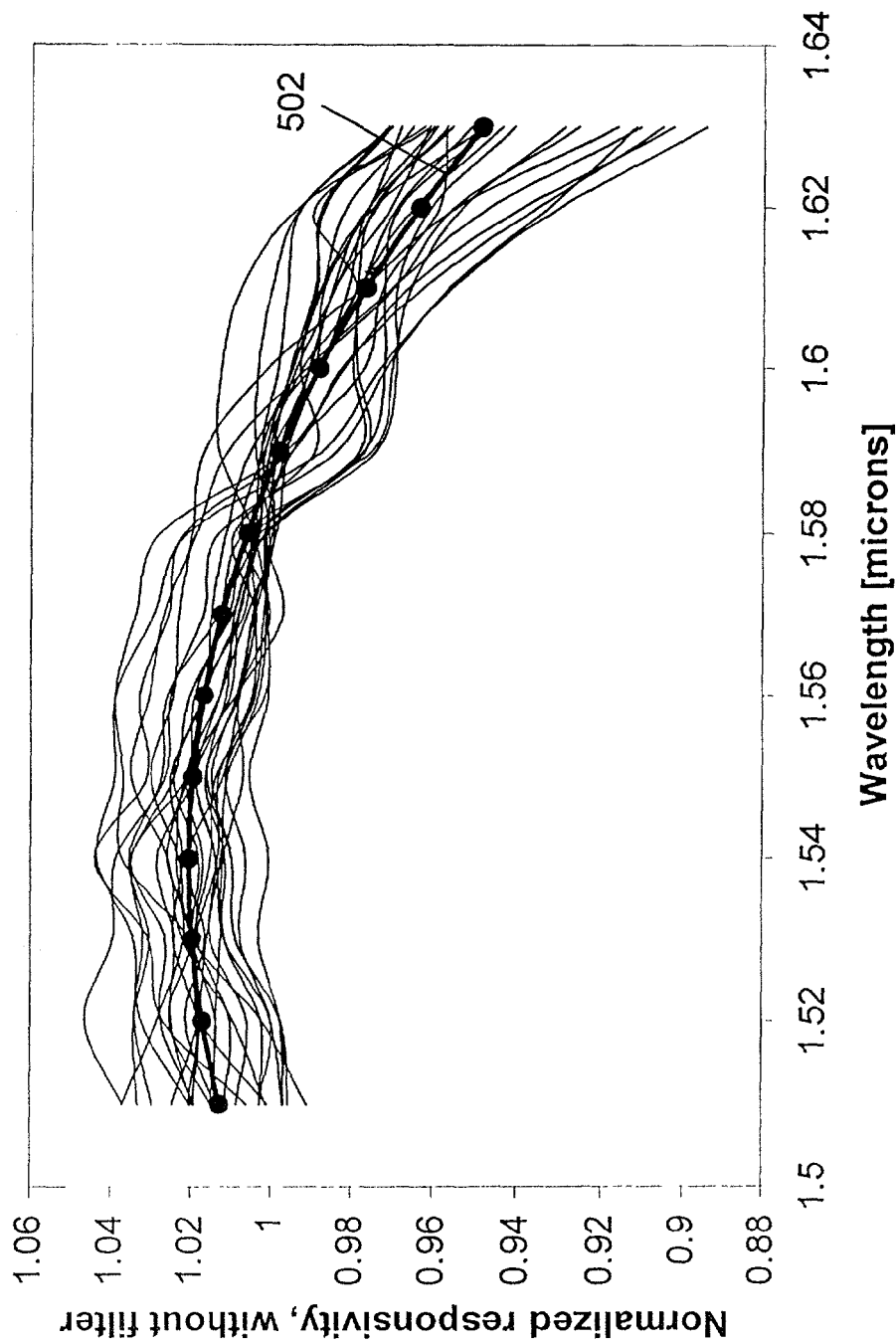
FIG. 5 presents curves illustrating spectral response of detectors used in a tap monitor.

Accordingly, it is advantageous to consider the wavelength dependent response of the photodetector unit 324 when designing the reflective coating to be used in the filter 316. For example, FIG. 5 illustrates the normalized photosensitive response of a number of different samples of one type of InGaAs photodiode (Hamamatsu Model G3476-05, produced by Hamamatsu Corp., Hamamatsu City, Japan) over the wavelength range 1.51 μm to 1.63 μm, a wavelength range that is commonly used for fiber optic communication. There is significant variation in the photosensitive response over the given wavelength range, particularly for longer wavelengths.

If the filter used to tap light for monitoring has a flat transmission characteristic, then the detection signal produced by the photodetector is strongly dependent on the photosensitive response characteristic of the photodetector. If, however, the filter does not have a flat transmission characteristic, but has a transmission characteristic that complements the photosensitive characteristic of the photodetector, then the detection signal is less dependent on the photosensitive characteristic of the photodetector.

A desired transmission characteristic for the filter that is used with a number of different types of photodetectors may be derived by first calculating an average wavelength dependent responsivity, $R_{ave}(\lambda)$ for the different samples of photodiodes. The average responsivity for the different photodiodes shown in FIG. 5 is illustrated as curve 502. A desired value of filter transmission, $T_0(\lambda)$, is then calculated so as to provide an overall monitor response $M(\lambda)$ that is relatively flat over the wavelength range of interest, where:

$$M(\lambda)=T_0(\lambda) \times R_{ave}(\lambda).$$

Figure 6:
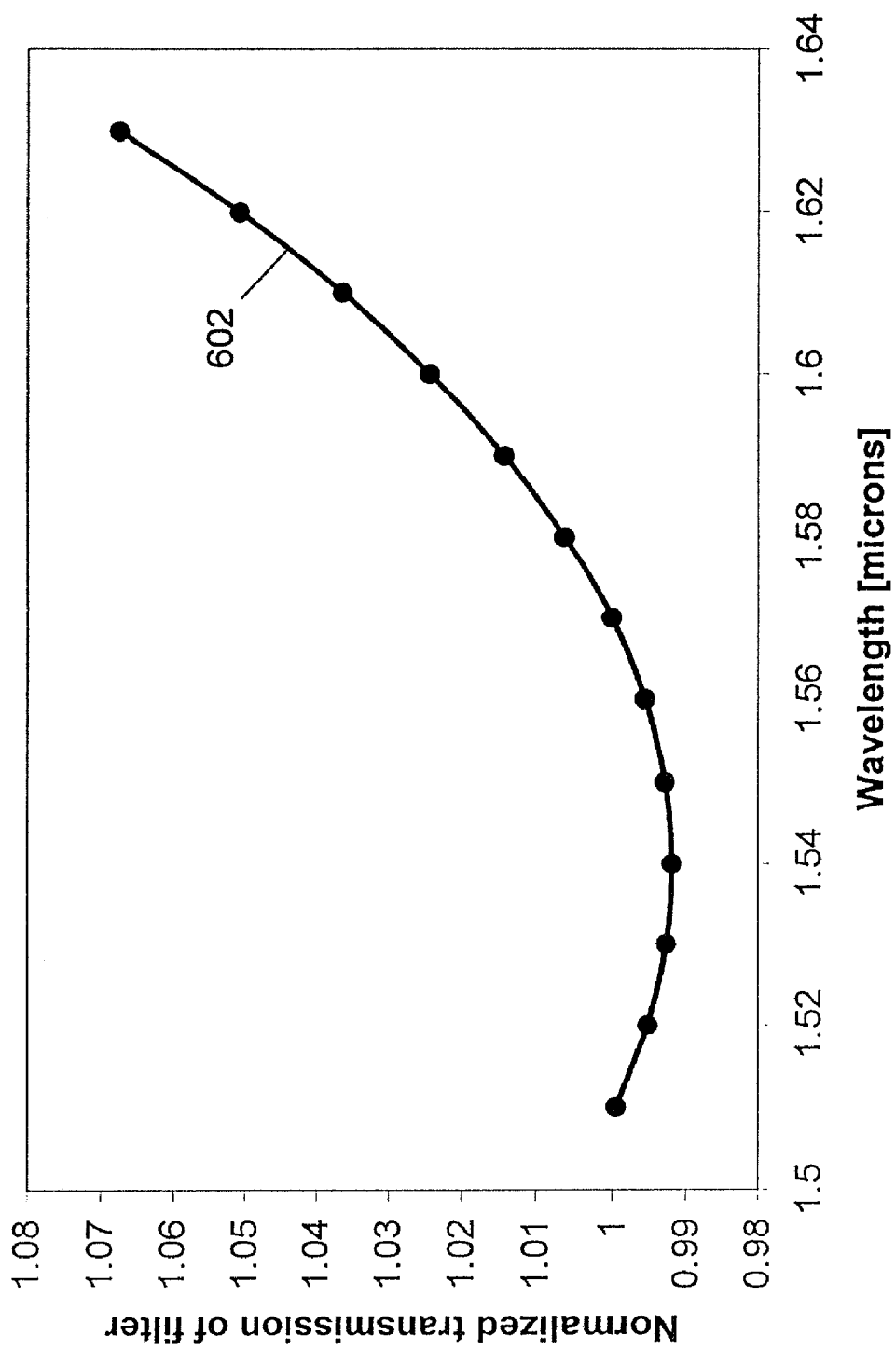
FIG. 6 shows a curve of a tap filter having a spectral response that compensates the spectral response of a detector.

FIG. 6 illustrates a curve 602 showing the desired transmission, $T_0(\lambda)$, that complements the average detector wavelength response, plotted against wavelength.

Figure 7:
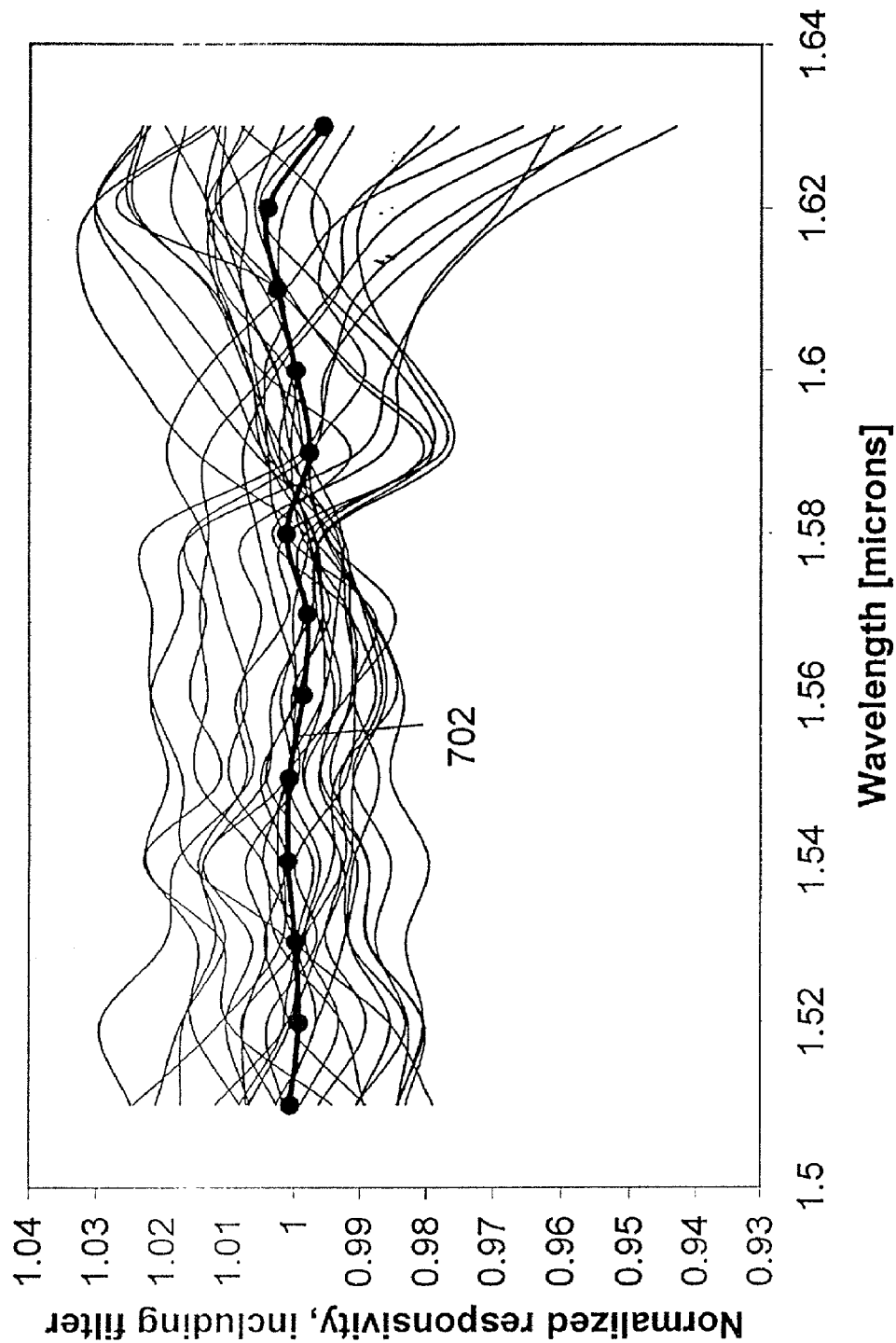
FIG. 7 presents curves illustrating spectral response of the tap monitor according to an embodiment of the present invention.

The calculated response of a tap monitor, using the filter whose transmission characteristic is shown as curve 602, is illustrated in FIG. 7 for the same photodiodes as were used to generate the data illustrated in FIG. 5. The curves illustrated in FIG. 7 may be considered to be the monitor spectral response, and were generated by multiplying the transmission $T_0(\lambda)$ with the measured photodiode responses illustrated in FIG. 5. Curve 702 represents the average expected response for monitors using the different photodiode samples. As can be seen, the monitor spectral response over the wavelength range for all samples is flatter, particularly in the range 1.51 μm–1.59 μm. Note that the y-axes in FIGS. 5 and 7 have different scales. The range of variation in response is also reduced. The monitor spectral response is flat to less than ±3% over the range 1.51 μm–1.61 μm, and averaged response is flat to within less than about ±0.5%. Over the entire wavelength range of 1.51 μm–1.63 μm, the uncorrected responses varied between 1.05 and 0.90 normalized units, compared to corrected responses ranging from 1.035 to 0.94.

A filter having a transmission characteristic closer to the desired characteristic $T_0(\lambda)$ is expected to provide further improvement in reducing the wavelength dependence of the response of a monitor.

In other approaches, the desired characteristic of the filter may be very narrow, to allow transmission of only a small range of wavelengths, for example individual optical communications channels, or a range of wavelengths, for example a specific wavelength band of light.

Figure 8:
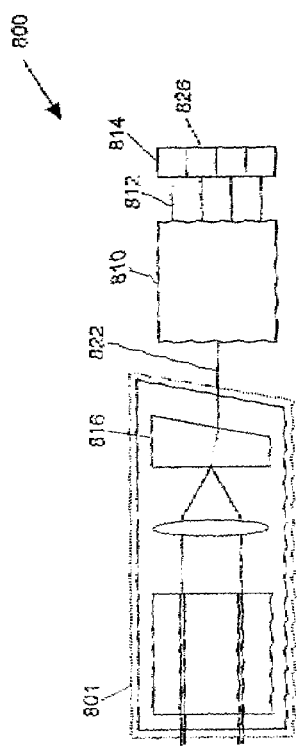
FIG. 8 schematically illustrates a tap for a channel monitor according to an embodiment of the present invention.

The filter having a response selected to correct the spectral response of the detector may also be used in a tap for a channel monitor, and is not restricted to use only in a tap monitor. A tap 800 for a channel monitor is illustrated in block schematic form in FIG. 8. The tap 800 includes a DFC 801 with a filter 816. The light 822 transmitted through the filter 816 is directed to a wavelength selecting element 810 that separates light of different wavelengths. The wavelength selecting element 810 spatially separates the different optical channels 812 present in the signal, so that each channel may be detected individually.

A detector unit 814 has a number of individual photodetectors 826 for detecting the separated individual channels 812. The detector unit 814 may be, for example, a photodiode or CCD array. The wavelength selecting element 810 may be any suitable dispersing element for spatially separating the different optical channels, a grating, a prism, an array waveguide, or may be an arrangement of wavelength selective reflectors, for example a network of filters or a fiber Bragg grating network.

The filter 816 may have a reflective coating whose spectral transmission characteristic is selected so as to compensate for the spectral response of the individual photodetectors 826, which are typically identical photodetectors. The beam 822 may propagate directly to the wavelength selection unit 810, or may be coupled via an optical fiber, for example via a single fiber collimator, to the wavelength selection unit 810.

Figure 9:
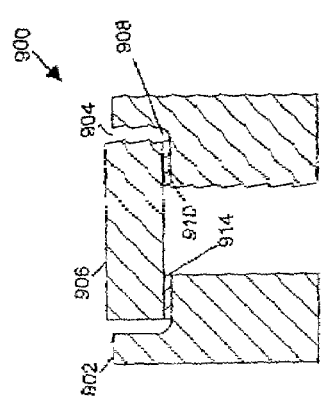
FIG. 9 schematically illustrates a partial cross-section of a conventional fiber optic device.

In many situations, it is important for fiber optic devices, including taps, that various characteristics such as insertion loss, return loss, etc. be as independent of temperature as possible. In many conventional fiber optic devices, the filter is glued to a holder that positions the filter relative to the collimating lenses. A cross-section of part of a conventional fiber device 900 is illustrated in FIG. 9, which shows a mount 902 having a recess 904 for mounting a filter 906. A lip 908 in the recess provides a flat surface 910 against which the filter 906 may be glued. However, a layer of glue 914, generally of indeterminate thickness, remains between the flat surface 910 and the filter 906 due to capillary action, even after the filter 906 has been pressed against the flat surface 910. The absolute thickness of the layer of glue 914 is typically not well controlled and may vary from assembly to assembly.

If the layer of glue 914 is thicker on one side of the mount 902 than the other, which is commonplace, given that the thickness of the glue layer 914 is generally uncontrolled, any thermal expansion or contraction may result in a tilting of the filter 906. Furthermore, if the glue 914 is not extremely homogeneous, for example, due to incomplete mixing of the different glue components, different regions of the glue layer 914 may manifest different temperature-dependent thicknesses, which also leads to tilting of the filter 906. Several characteristics of the device 900, such as return loss and insertion loss, are critically dependent on the tilt of the filter 906 and, consequently, may change with temperature. For example, a tilt of one side of the filter 906 through 0.01° may lead to a change in the insertion loss of as much as 0.01 dB.

Figure 10A:
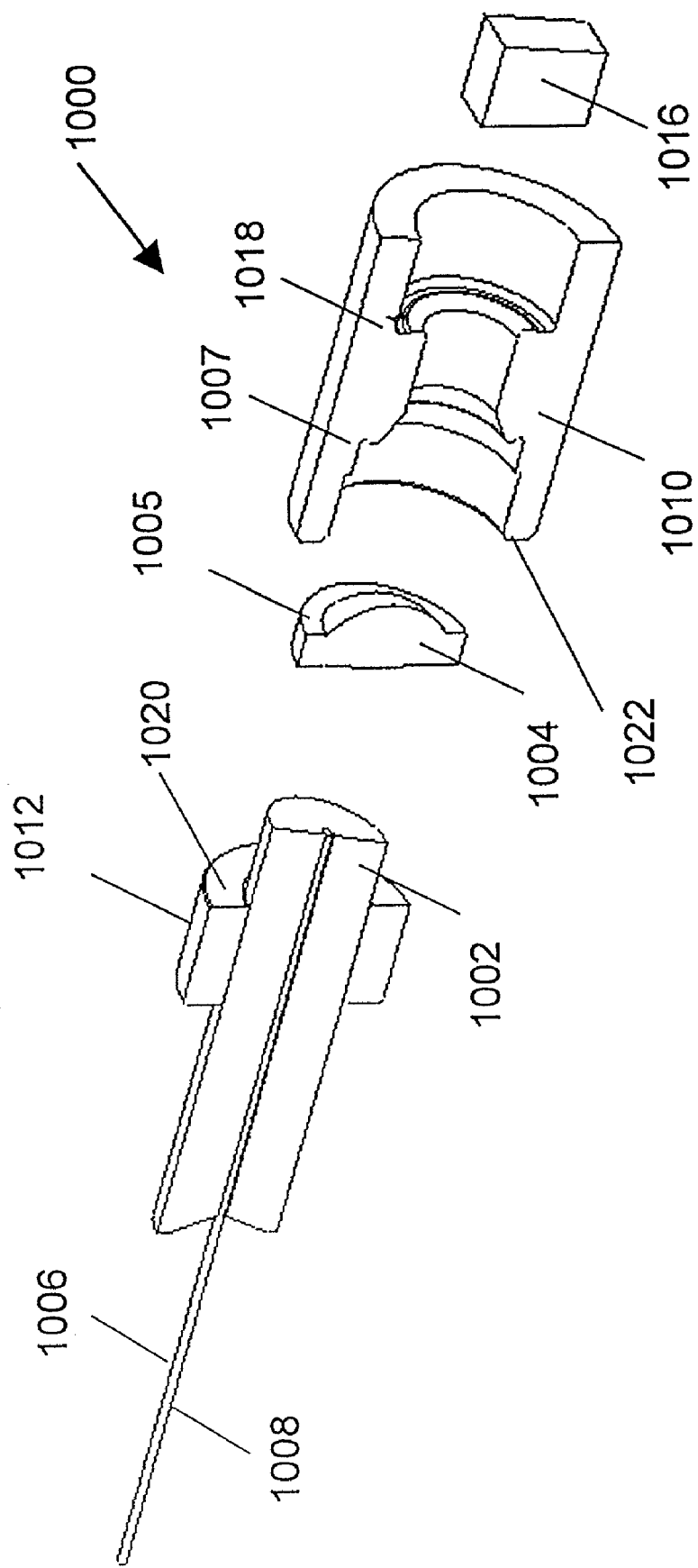
FIG. 10A schematically illustrates an exploded view of a dual fiber collimator according to an embodiment of the present invention.

It is often advantageous to reduce the temperature dependence of the device characteristics, so that operation is uniform despite changing temperatures. An exploded view of an embodiment of a DFC 1000 that has characteristics with reduced temperature dependence is schematically illustrated in FIG. 10A. The fibers 1006 and 1008 are mounted within the dual fiber ferrule 1002. The lens 1004 may be provided with a flat surface 1005 for mounting against a corresponding surface 1007 of the lens/filter mount 1010 using an adhesive. A ferrule sleeve 1012 is attached to the outside of the ferrule 1002 and the ferrule inserted in the mount 1010, with the sleeve face 1020 against the ferrule-mounting face 1022 at the end of the mount 1010. The sleeve 1012 is mounted at a distance from the end of the ferrule 1002 that ensures that the fibers 1006 and 1008 are correctly spaced from the lens 1004.

The filter 1016 is mounted to a mounting surface 1018 of the lens/filter mount 1010 using an adhesive. The filter 1016 may have a circular cross-section, but may also have a non-circular cross-section. The illustrated example of filter 1016 has a rectangular or square cross-section, which is conveniently fabricated from slicing and dicing a large filter sheet.

Figure 10B:
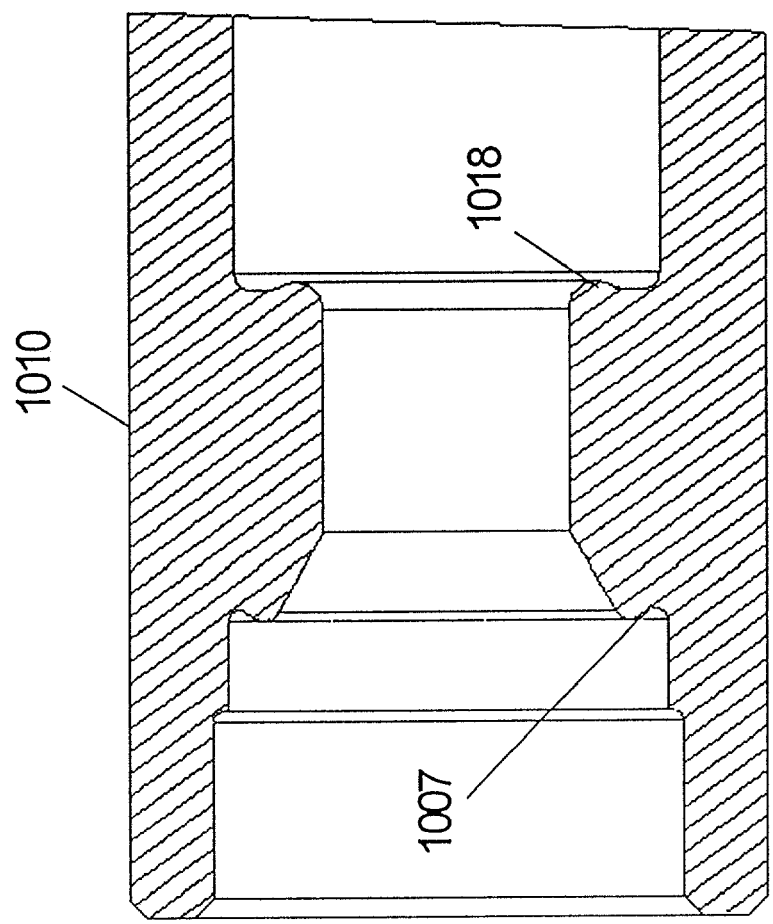
FIG. 10B presents a cross-sectional view of the lens/filter mount illustrated in FIG. 10A.

An expanded view of a cross-section of the mount 1010 is illustrated in FIG. 10B, showing the lens and filter mounting surfaces 1007 and 1018.

Figure 11A:
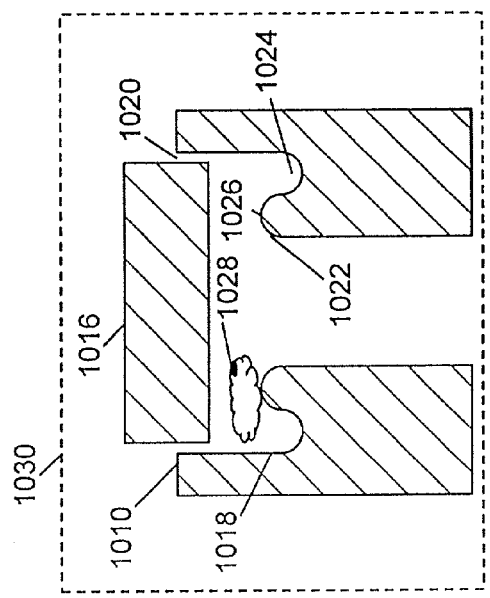
FIGS. 11A and 11B schematically illustrate a partial cross-section of a lens/filter mount, before and after mounting an optical element respectively, according to an embodiment of the present invention.

A cross-section through the lens/filter mount 1010 is schematically illustrated in FIG. 11A. The filter mounting surface 1018 of the lens/filter mount 1010 may be provided in a recess 1020, although this is not a requirement. The filter mounting surface 1018 includes a raised portion 1022 and may also include a well 1024 on one or both sides of the raised portion 1022. In the illustrated embodiment, a well 1024 is provided on one side of the raised portion 1022. The raised portion 1022 presents a tip 1026 for contacting the filter 1016, rather than a flat surface. The filter 1016 is shown close to the mounting surface 1018, with adhesive 1028 disposed between the filter 1016 and the mounting surface 1018, prior to mounting.

Figure 11B:
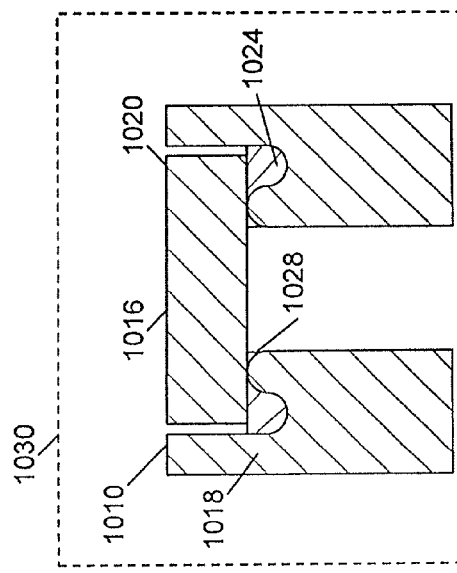

As the filter 1016 is forced towards the mounting surface 1018, the adhesive 1028 is expelled from the region between the tip 1026 and the filter 1016 until the filter 1016 contacts the tip 1026. The expelled adhesive 1028 flows away from the tip 1026, down one or both sides of the raised portion 1022, and may flow to the well 1024. The well 1024 need not be filled with expelled adhesive 1028. Since the tip 1026 has a very small area, it is possible to expel the adhesive 1028 entirely from between the tip 1026 and the filter 1016, so that the filter 1016 contacts the tip 1026, as illustrated in FIG. 11B. The lens/filter mount 1010, filter 1016 and adhesive 1028 are raised in temperature, preferably to a temperature higher than the expected operating temperature of the resulting fiber optic device. The adhesive 1028 is cured at the high temperature.

After curing, the assembly 1030 of the lens/filter mount 1010, filter 1016 and adhesive 1028 is allowed to cool. The adhesive 1028 cools down under tension. The adhesive 1028 has a higher thermal expansion coefficient than the mount 1010. As long as the operating temperature is less than the cure temperature, the adhesive 1028 remains in tension, pulling the filter 1016 toward the mounting surface 1018. Since the filter 1016 is in actual contact with the mounting surface 1018 at the contact tips 1026, the filter 1016 does not move relative to the mount 1010 as the temperature changes within the operating range. Consequently, when the operating temperature of the assembly 1030 varies, the filter 1016 does not tilt with respect to the lens/filter mount 1010, and reduces the temperature dependence of the device operating characteristics. For example, where the assembly 1030 is employed in a tap monitor, the temperature dependence of the coupling and insertion losses is reduced.

One example of a suitable adhesive 1028 is type 353 NDT produced by Epotek Corp., Billerica, Mass. This is a two-part epoxy that is cured thermally. Furthermore, the type 353 NDT epoxy is thixotropic, which reduces the ability of the adhesive to flow even under elevated temperatures. Thus, the adhesive does not flow along the surface of the filter 1016 while curing. Other types of adhesive that cure at elevated temperatures may also be used.

The lens/filter mount 1010 was manufactured from a martensitic, SE-doped stainless steel, type 182. The mount 1010 was mounted in a jig and the mixed epoxy was applied to the mounting surface 1018. The filter 1016, formed on a substrate of B270 glass and presenting a face approximately 1.5 mm×1.5 mm to the mount 1010, was forced against the mounting surface 1018 with a force of 1 N, and the jig assembly was inserted into an oven for curing at 120° C. for 30 mins.

It will be appreciated that other optical elements, and not only an optical filter, may be mounted in a similar manner. For example, the lens 1004 may be mounted to the lens/filter mount 1010 in the same way in order to reduce movement of the lens due to changing temperature.

A useful figure of merit to describe thermal effects is the temperature dependent loss over the range −20° C.–75° C., in other words how much the loss of the device changes between −20° C. and 75° C. Conventional tap monitors typically have a temperature dependent loss in the range 0.1 dB–0.15 dB. A tap monitor of the design illustrated in FIG. 3 was fabricated with the lens and filter mounted as illustrated in FIG. 11B. The temperature dependent loss of that device was measured to be 0.04 dB, significantly lower than other devices.

The mounting surface 1018 in the example just described was assumed to be cylindrically symmetric. However, the mounting surface 1018 may not be uniform, for example due to manufacturing tolerances. One example of non-uniformity is that the height of the tip 1026 above the well 1024 may vary tangentially around the mount 1010. In such a case, the filter 1016 may not contact the entire tip region 1026 all the way around the mount 1010. The filter 1016 does, however, contact at least three points of the raised portion 1022 around the mount 1010, which provides sufficient filter/tip contact to prevent the filter 1016 from moving relative to the mount 1010 under conditions of changing temperature.

Figure 12:
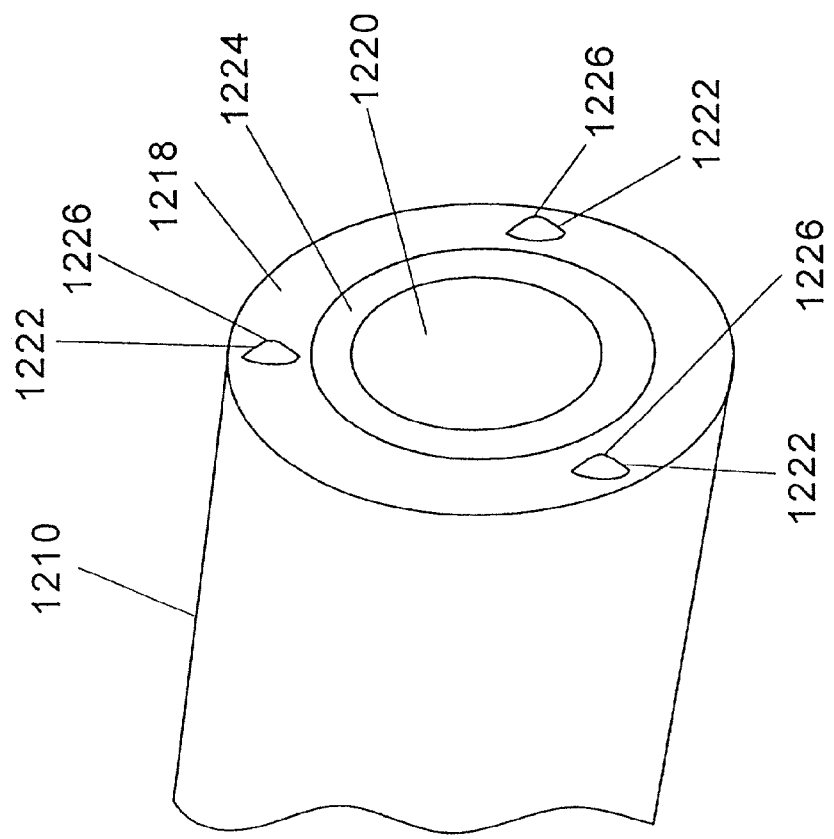
FIG. 12 schematically illustrates another embodiment of mount for mounting an optical element according to the present invention.

A mount 1210 having another type of mounting surface 1218 is schematically illustrated in FIG. 12. Although the aperture 1220 is circular, raised portions 1222, having tips 1226, are positioned at various points around the mounting surface 1218, rather than being provided as a ring. The three highest tips 1226 define a mounting plane on which the surface of the filter rests. More raised portions 1222 may be provided on the surface 1218. A well 1224 may extend as a ring around the mount 1210, or individual wells (not illustrated) may be provided close to each raised portion 1222.

It should be understood that the mount 1010 may have a different shape, and need not be cylindrically symmetric. A cylindrical symmetry is useful because the mount 1010 can be readily manufactured by turning. Other geometries may be used, for example, the mount 1010 may have a square or rectangular cross-section.

Figure 13:
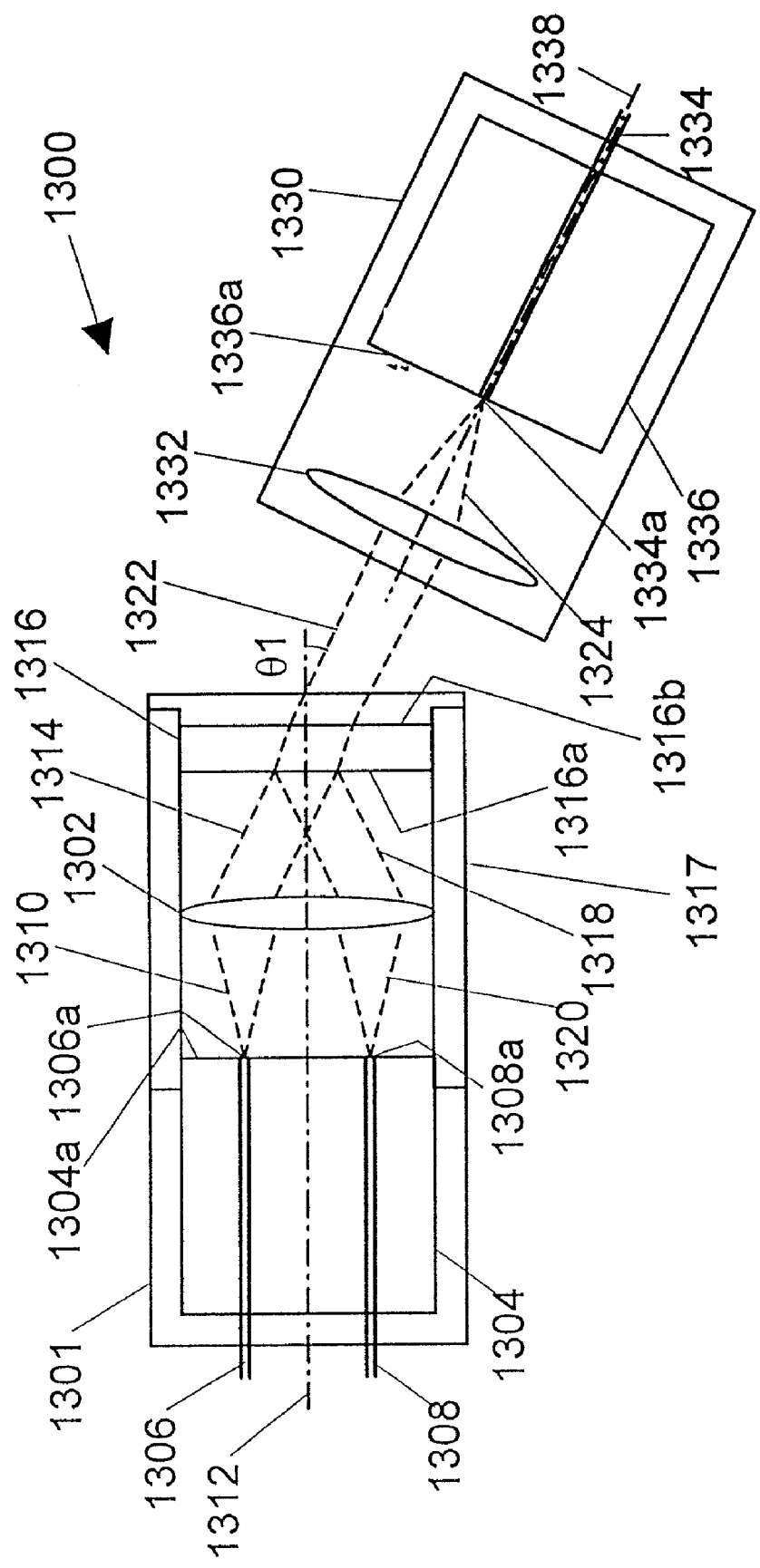
FIG. 13 schematically illustrates an embodiment of a filter-based add/drop filter according to the present invention.

It will be appreciated that the mounting technique just described for mounting a filter is not limited to use in a tap monitor and may be used for mounting a filter in other types of devices, for example a filter-based multiplexer/demultiplexer or a filter-based add/drop multiplexer. A schematic view of a filter-based add/drop multiplexer device 1300 that may use the mounting technique is presented in FIG. 13. The dual-fiber collimator 1301 includes a first lens 1302 and a dual-fiber ferrule 1304. The first lens 1302 is mounted on a lens/filter mount 1317. Two fibers 1306 and 1308 are held in the ferrule 1304, with their ends 1306a and 1308a positioned at a distance from the lens 1302 equal to about the focal length of the lens 1302. The ferrule end 1304a, and the fiber ends 1306a and 1308a may be polished at a small angle to prevent reflections feeding to other elements.

A first light beam 1310, from the first fiber 1306, passes through the lens 1302 and is collimated. However, since the beam 1310 is not positioned on the lens axis 1312, the collimated beam 1314 propagates at an angle, θ1, to the axis 1312. For typical systems, the value of θ may be around 2°, depending on such factors as the focal length of the lens 1302 and the separation between the two fibers 1306 and 1308.

The collimated beam 1314 is incident on the filter 1316, which is mounted on the lens/filter mount 1317. The filter 1316 reflects a portion of the beam 1314 as a reflected beam 1318, and transmits the remainder of the beam 1314 as a transmitted beam 1322. The reflected beam 1318 is reflected to the first lens 1302 which focuses the beam 1320 to the second fiber 1308.

The transmitted beam 1322 passes through the filter 1316 to a single fiber collimator unit (SFC) 1330. The SFC 1330 includes a lens 1332 and a fiber 1334 that is held in the single fiber ferrule 1336. When used in conjunction with the DFC 1301 and the filter 1316, the transmitted beam 1322 is focused by the lens 1332 into the third fiber 1334 as beam 1324. In this embodiment, the third fiber 1334 is disposed on the axis 1338 of the lens 1332, and the SFC 1330 is oriented so that the beam 1322 from the DFC 1301 is parallel to the axis 1338. The ferrule end 1336a and the fiber end 1334a may be polished at a small angle to prevent reflections feeding back to other elements.

The filter 1316 may have a multilayer dielectric filter coating, typically on the first surface 1316a, with the second surface 1316b having an anti-reflection coating. The filter 1316 may transmit a fraction of the light incident from the first fiber 1306 to the third fiber 1334. For example, where the light 1310 contains light in multiple optical channels at different channel wavelengths, the filter 1316 may transmit light in only one or a small number of optical channels, reflecting the remaining light to the second fiber 1308.

It will also be appreciated that the mounting technique is not limited to mounting only filters, but may also be applied to mounting many different types of optical elements. For example, the mounting technique may be used to mount the lens 1004 to the mounting surface 1007. Other elements, such as polarizers, that are face mounted to a mount, may also be subject to the technique.

Figure 14A:
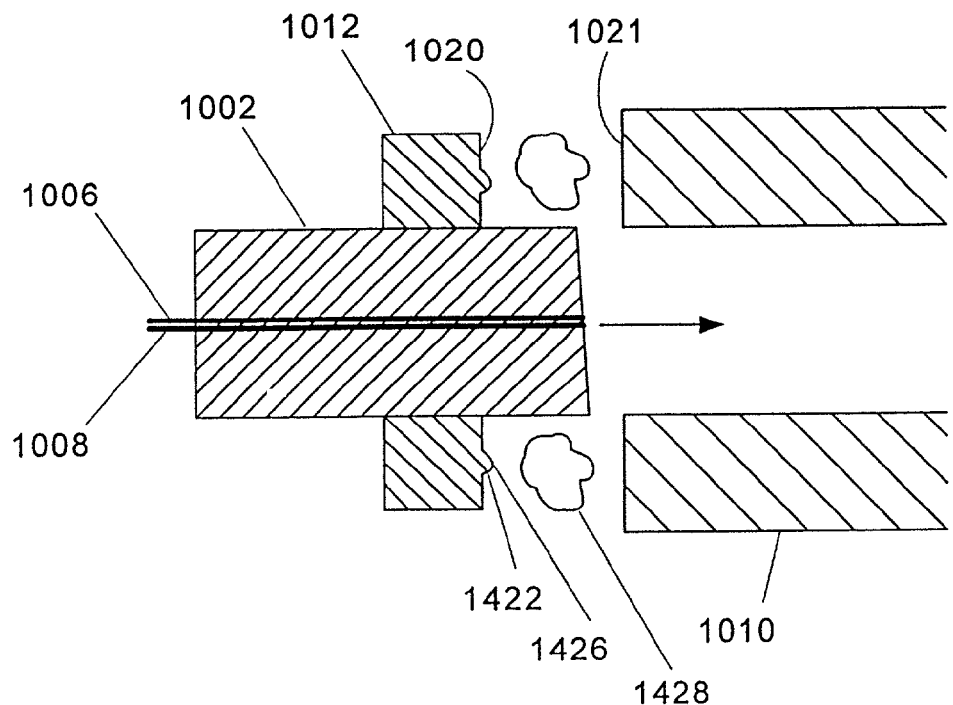
FIGS. 14A and 14B schematically illustrate partial cross-sections of a lens/filter mount, before and after mounting a dual fiber ferrule, according to an embodiment of the present invention.
Figure 14B:
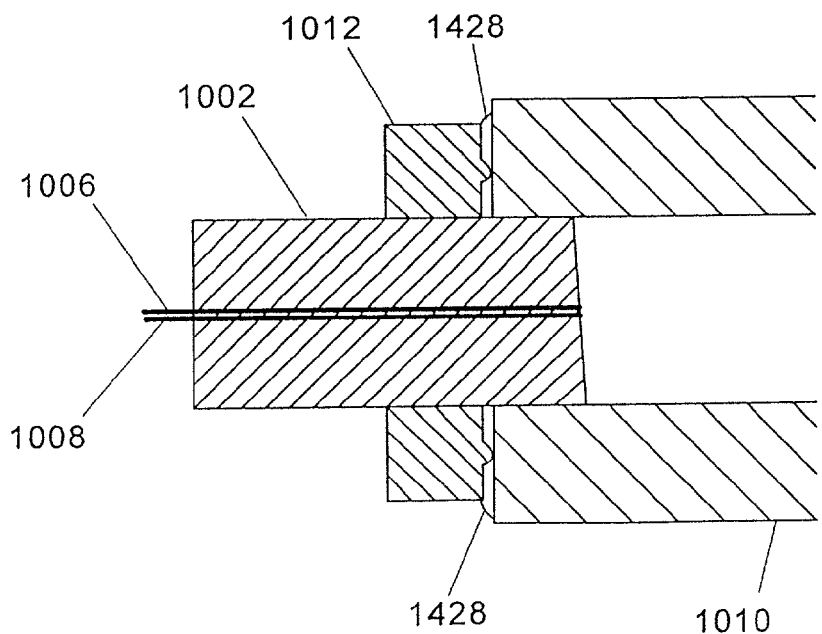

Other components may be mounted using the technique. For example, a sub-assembly may be mounted to another sub-assembly using the technique. In an example, illustrated in cross-section in FIGS. 14A and 14B, the ferrule sleeve 1012 may be provided with raised portions 1422 on the sleeve face 1020. The tips 1426 of the raised portions 1422 are placed in contact with the ferrule-mounting face 1022 of the mount 1010, with adhesive 1428 between the sleeve face 1020 and the ferrule mounting face 1022. The adhesive 1428 is squeezed out from between the tips 1426 and the face 1022. This approach of mounting the ferrule 1002 to the mount 1010 reduces temperature-dependent movement between the ferrule 1002 and the mount 1010, particularly temperature dependent tilting between the ferrule 1002 and the mount 1010.

As noted above, the present invention is applicable to fiber optic devices and is believed to be particularly useful in fiber optic devices that use one or more dual fiber collimator units, such as filter units. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification.

We claim:

1. A tap monitor unit, comprising:
   a focusing unit having an optical axis;
   an input port;
   a filter unit on the optical axis, a first optical path being defined from the input port through the focusing unit to the filter unit, the first path being incident on a first side of the filter unit in a direction non-parallel with the optical axis, the filter unit having a light bending element; and
   a photodetector disposed on a second side of the filter unit, a second optical path between the filter unit and the photodetector being substantially parallel to the optical axis, light propagating on the first optical path being transmitted through the filter unit and deviated by the light bending element along the second optical path to the photodetector.

2. A unit as recited in claim 1, further comprising an output port on the first side of the filter unit, a third optical path coupling between the filter unit and the output port, light propagating on the first optical path being reflected by the filter unit along the third optical path to the output port.

3. A unit as recited in claim 2, wherein the third optical path passes through the focusing unit to the output port.

4. A unit as recited in claim 2, wherein the input port is a first optical fiber and the output port is a second optical fiber, the first and second optical fibers being mounted in a fiber ferrule.

5. A unit as recited in claim 2, wherein the first and second fibers have end faces spaced apart from the focusing unit by a distance approximately equal to a focal length of the focusing unit.

6. A unit as recited in claim 1, wherein the focusing unit is a lens having at least one curved refracting surface.

7. A unit as recited in claim 1, wherein the focusing unit is a GRIN lens.

8. A unit as recited in claim 1, wherein the input port includes a first fiber mounted in a fiber ferrule.

9. A unit as recited in claim 1, wherein the filter unit includes a substrate having a reflective coating to reflect light incident along the first optical path.

10. A unit as recited in claim 9, wherein a value of reflectivity for the reflective coating is between 90% and 99.9%.

11. A unit as recited in claim 1, wherein the filter unit includes non-parallel first and second surfaces that comprise the light bending element, a wedge angle between the first and second surfaces having a value of at least 2°.

12. A unit as recited in claim 11, wherein the filter unit includes a substrate, the first and second surfaces being respective surfaces of the substrate.

13. A unit as recited in claim 12, further comprising a reflective coating on one of the surfaces of the substrate.

14. A unit as recited in claim 12, wherein the filter unit includes a filter element and a wedged element, the first and second surfaces being respective surfaces of the wedged element, the wedged element having a sufficiently large wedge angle as to deviate light propagating on the first optical path to propagate along the second optical path.

15. A unit as recited in claim 1, wherein the photodetector has a detector surface non-perpendicular to the second optical path.

16. An optical system, comprising:
an optical transmitter producing output light;
an optical receiver receiving at least a portion of the output light; and
an optical fiber link coupling between the optical transmitter and the optical receiver, the optical fiber link including a tap monitor having
a focusing unit having an optical axis;
an input port;
a filter unit on the optical axis, a first optical path being defined from the input port through the focusing unit to the filter unit, the first path being incident on a first side of the filter unit in a direction non-parallel with the optical axis, the filter unit having a light bending element; and
a photodetector disposed on a second side of the filter unit, a second optical path between the filter unit and the photodetector being substantially parallel to the optical axis, light propagating on the first optical path being transmitted through the filter unit and being deviated by the light bending element along the second optical path to the photodetector.

17. A system as recited in claim 16, further comprising one or more optical amplifier units disposed on the optical fiber link between the optical transmitter and the optical receiver.

18. A system as recited in claim 16, wherein the optical transmitter includes modulated light sources operating at different wavelengths and optical combining elements to combine outputs from the modulated light sources into a fiber output coupled to the optical fiber link.

19. A system as recited in claim 16, wherein the optical receiver includes optical separating elements to separate different wavelengths of light received from the optical fiber link and to direct light at different wavelengths to respective detectors.

20. A system as recited in claim 16, further comprising an optical add/drop multiplexer disposed on the optical fiber link, the optical add/drop multiplexer being coupled to another optical fiber system.

21. A method of monitoring light propagating along an optical fiber, comprising:
transmitting the light from the fiber through a focusing unit to form a substantially collimated beam propagating in a direction non-parallel with an optical axis of the focusing unit;
transmitting a portion of the substantially collimated beam through a filter unit;
diverting the transmitted portion of the substantially collimated beam by the filter unit into a direction substantially parallel to the optical axis using the filter unit; and
detecting the transmitted portion of the substantially collimated beam.

22. A method as recited in claim 21, further comprising reflecting another portion of the substantially collimated beam with the filter unit and focusing the reflected portion of light into an output fiber.

23. A method as recited in claim 22, wherein focusing the reflected portion of the light includes focusing the reflected portion of light into the output fiber using the focusing unit.

24. A method as recited in claim 21, wherein transmitting a portion of the substantially collimated beam through the filter unit includes transmitting between 0.1% and 10% of the substantially collimated beam through the filter unit.

25. A method as recited in claim 21, wherein diverting the transmitted portion of the substantially collimated beam includes diverting the transmitted portion of the substantially collimated beam through an angle in the range 1.5°–2.5°.

26. A device for monitoring light propagating along an optical fiber, comprising:
means for transmitting the light from the fiber through a means for focusing to form a substantially collimated beam, propagating in a direction non-parallel with an optical axis of the means for focusing;
means for transmitting a portion of the substantially collimated beam through a means for filtering;
means for diverting the transmitted portion of the substantially collimated beam into a direction substantially parallel to the optical axis; and
means for detecting the transmitted portion of the substantially collimated beam.

27. A monitor unit for monitoring light propagating within an optical fiber, the unit comprising:
an input port;
a filter unit, the input port being disposed on a first side of the filter unit, light from the input port being non-normally incident on the filter unit, the filter unit introducing a polarization dependent loss to light transmitted through the filter unit; and
a photodetector unit, having a detector element, disposed on a second side of the filter unit, one or more optical elements along a light path between the input port and the detector element having a polarization dependent loss selected so as to at least partially compensate for the polarization dependent loss of the filter unit.

28. A monitor unit as recited in claim 27, wherein the photodetector unit has a polarization dependent loss that at least partially compensates for the polarization dependent loss of the filter unit.

29. A monitor unit as recited in claim 28, wherein the photodetector unit includes a window and a plane of incidence of light on the window is different from a plane of incidence of light on the filter unit.

30. A monitor unit as recited in claim 29, wherein the plane of incidence of light on the window is approximately perpendicular to the plane of incidence of light on the filter unit.

31. A monitor unit as recited in claim 28, wherein the photodetector unit includes a window and a plane of incidence of light on the window is parallel to a plane of incidence of light on the filter unit.

32. A monitor unit as recited in claim 27, further comprising a polarization loss compensating element disposed on the light path between the input port and the detector element.

33. A monitor unit as recited in claim 32, wherein the polarization loss compensating element is disposed between the filter unit and the photodetector unit.

34. A monitor unit as recited in claim 27, wherein the input port is an end of a first optical fiber.

35. A monitor unit as recited in claim 34, further comprising a second optical fiber, light from the input port reflected by the filter unit to an input end of a second optical fiber.

36. A monitor unit as recited in claim 35, wherein the focusing unit has an optical axis, the light propagating from the focusing unit to the filter unit propagating in a direction non-parallel to the optical axis.

37. A monitor unit as recited in claim 34, further comprising a focusing unit, having at least one lens, disposed between the input port and the filter unit, the focusing unit substantially collimating light propagating from the input port to the filter unit.

38. A monitor unit as recited in claim 37, wherein light transmitted through the filter unit propagates to the detector in a direction substantially parallel to the optical axis.

39. A monitor unit as recited in claim 37, wherein light reflected from the filter unit is focused by the at least one lens to a second optical fiber.

40. An optical system, comprising:
- an optical transmitter producing output light;
- an optical receiver receiving at least a portion of the output light; and
- an optical fiber link coupling between the optical transmitter and the optical receiver, the optical fiber link including a monitor unit having:
  - an input port coupled to receive light from the optical fiber link;
  - a filter unit, the input port being disposed on a first side of the filter unit, light from the input port being non-normally incident on the filter unit, the filter unit introducing a polarization dependent loss to light transmitted through the filter unit; and
  - a photodetector unit, having a detector element, disposed on a second side of the filter unit, one or more elements along a light path between the input port and the detector element having a polarization dependent loss selected so as to at least partially compensate for polarization dependent loss of the filter unit.

41. A system as recited in claim 40, further comprising one or more optical amplifier units disposed on the optical fiber link between the optical transmitter and the optical receiver.

42. A system as recited in claim 40, wherein the optical transmitter includes modulated light sources operating at different wavelengths and optical combining elements to combine outputs from the modulated light sources into a fiber output coupled to the optical fiber link.

43. A system as recited in claim 40, wherein the optical receiver includes optical separating elements to separate different wavelengths of light received from the optical fiber link and to direct light at different wavelengths to respective detectors.

44. A system as recited in claim 40, further comprising an optical add/drop multiplexer disposed on the optical fiber link, the optical add/drop multiplexer being coupled to another optical fiber system.

* * * * *